(12) United States Patent
Hwang

(10) Patent No.: US 12,061,892 B2
(45) Date of Patent: Aug. 13, 2024

(54) FIRMWARE UPDATING METHOD, AND ELECTRONIC APPARATUS AND STORAGE MEDIA FOR SAME

(71) Applicant: Samsung Electronics Co., Ltd., Suwon-si (KR)

(72) Inventor: Taeyoon Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 283 days.

(21) Appl. No.: 17/310,115

(22) PCT Filed: Nov. 28, 2019

(86) PCT No.: PCT/KR2019/016630
§ 371 (c)(1),
(2) Date: Jul. 16, 2021

(87) PCT Pub. No.: WO2020/149520
PCT Pub. Date: Jul. 23, 2020

(65) Prior Publication Data
US 2022/0100490 A1   Mar. 31, 2022

(30) Foreign Application Priority Data

Jan. 18, 2019 (KR) .......................... 10-2019-0007025

(51) Int. Cl.
*G06F 9/445* (2018.01)
*G06F 3/04842* (2022.01)
(Continued)

(52) U.S. Cl.
CPC ............ *G06F 8/65* (2013.01); *G06F 3/04842* (2013.01); *G06F 16/168* (2019.01)

(58) Field of Classification Search
CPC ....... G06F 8/65; G06F 16/168; G06F 3/04842
(Continued)

(56) References Cited

U.S. PATENT DOCUMENTS

2003/0182411 A1   9/2003   Wang et al.
2005/0216718 A1   9/2005   Rao
(Continued)

FOREIGN PATENT DOCUMENTS

JP   2005-284902 A   10/2005
JP   2007-310690 A   11/2007
(Continued)

OTHER PUBLICATIONS

International Search Report and Written Opinion of the International Searching Authority dated Mar. 9, 2020 in connection with International Application No. PCT/KR2019/016630, 15 pages.
(Continued)

*Primary Examiner* — Chuck O Kendall

(57) ABSTRACT

According to various embodiments, an electronic device comprises a display, a processor, and a memory, wherein the memory may store instructions configured to, when executed, cause the processor to: control the display so as to output information about a plurality of update files for updating a first firmware stored in a first partition of the memory; obtain a selection involved with at least one first update file among the plurality of update files; and on the basis of the selection, store, in a second partition of the memory, a second firmware in which the at least one first update file is applied to a part of the first firmware. Other embodiments are possible.

10 Claims, 17 Drawing Sheets

(51) Int. Cl.
*G06F 8/65* (2018.01)
*G06F 16/16* (2019.01)

(58) Field of Classification Search
USPC .................................................. 717/168–178
See application file for complete search history.

(56) References Cited

U.S. PATENT DOCUMENTS

| | | | |
|---|---|---|---|
| 2008/0030757 A1 | 2/2008 | Ingles et al. | |
| 2011/0061082 A1 | 3/2011 | Heo et al. | |
| 2013/0125107 A1* | 5/2013 | Bandakka | G06F 11/1433 |
| | | | 717/171 |
| 2013/0167134 A1 | 6/2013 | Shim et al. | |
| 2015/0143070 A1* | 5/2015 | Lee | G06F 12/1491 |
| | | | 711/173 |
| 2016/0314299 A1 | 10/2016 | Almer | |
| 2017/0286094 A1 | 10/2017 | Westerkowsky | |
| 2018/0349129 A1 | 12/2018 | Ju et al. | |
| 2018/0357058 A1 | 12/2018 | Malaspina et al. | |
| 2019/0364036 A1* | 11/2019 | Simpson | H04W 4/60 |

FOREIGN PATENT DOCUMENTS

| | | |
|---|---|---|
| KR | 10-2010-0010761 A | 2/2010 |
| KR | 10-2011-0025416 A | 3/2011 |
| KR | 10-2018-0131840 A | 12/2018 |

OTHER PUBLICATIONS

Request for the Submission of an Opinion dated Oct. 26, 2023, in connection with Korean Patent Application No. 10-2019-0007025, 11 pages.

* cited by examiner

1300

1310 android / platform / external / chromium-libpac /
948d4753664cc4e6b33cc3de634ac8fd5f781382 / . / Android.mk blob: ae0e768e5553d9292f3f63f7ababd230982a2157 [file] [log] [blame]

LOCAL_PATH := $(call my-dir)
include $(CLEAR_VARS)
LOCAL_ADDITIONAL_DEPENDENCIES := $(LOCAL_PATH)/Android.mk LOCAL_CPP_EXTENSION := .cc

Set up the target identity

```
LOCAL_MODULE := libpac
LOCAL_MODULE_CLASS := SHARED_LIBRARIES
```
1315

1305 android / platform / external / chromium-libpac /
948d4753664cc4e6b33cc3de634ac8fd5f781382 commit  948d4753664cc4e6b33cc3de634ac8fd5f781382
author  Pavel Grafov <pgrafov@google.com>
committer  abde036a7477061c0ae5ca992a9df3f2ad644ed4
parent  8c47eebd81c996f17198edb2fa504c04d48d567e [diff]

Test for error in handling getters changing element kind.

Bug: 111274046
Test: m -j proxy_resolver_v8_unittest && adb sync && adb shell \
/data/nativetest64/proxy_resolver_v8_unittest/proxy_resolver_v8_unittest
Merged-In: I99def991ebcb7c26ba7ca4b4b31ef1cdeaea7721
Change-Id: I99def991ebcb7c26ba7ca4b4b31ef1cdeaea7721
(cherry picked from commit 59b9b11a462fe3aad313b8538fb98468f22d9095)

Android.mk  [diff]
test/Android.mk  [diff]
test/js-unittest/change_element_kind.js  [Added - diff]
test/proxy_resolver_v8_unittest.cc  [diff]
test/proxy_test_script.h  [diff]

FIG.13

| | | | |
|---|---|---|---|
| META-INF | libimageextractor.so.p | 2011-06-22 PM... File | 5KB |
| patch | libinputservice.so.p | 2011-06-22 PM... File | 5KB |
|   system | libjackservice.so.p | 2011-06-22 PM... File | 28KB |
|     app | libmctraster.so.p | 2011-06-22 PM... File | 5KB |
|       Bluetooth | libmedia.so.p | 2011-06-22 PM... File | 32KB |
|       Chrome | libmedia_jni.so.p | 2011-06-22 PM... File | 16KB |
|     bin | libmediacapture_jni.so.p | 2011-06-22 PM... File | 4KB |
|     container | libmediadrm.so.p | 2011-06-22 PM... File | 14KB |
|     CSC | libmediandk.so.p | 2011-06-22 PM... File | 13B |
|     etc | libmtp_samsung.so.p | 2011-06-22 PM... File | 17KB |
|     frmework | libpac.so.p | 2011-06-22 PM... File | 542KB ~1410 |
|     lib | libremotedisplay_wfd.so.p | 2011-06-22 PM... File | 18KB |
|     priv-app | libremotedisplayservice.so.p | 2011-06-22 PM... File | 5KB |
|     bendor | librs_jni.so.p | 2011-06-22 PM... File | 6KB |
|   recovery | libsec_ode_keymanager.so.p | 2011-06-22 PM... File | 27KB |
|   SEC-INF | libsec-ims.so.p | 2011-06-22 PM... File | 264KB |
|   system | libsemmediaplayer_jni.so.p | 2011-06-22 PM... File | 4KB |

FIRMWARE UPDATING METHOD, AND ELECTRONIC APPARATUS AND STORAGE MEDIA FOR SAME

CROSS-REFERENCE TO RELATED APPLICATIONS

This application is a 371 National Stage of International Application No. PCT/KR2019/016630, filed Nov. 28, 2019, which claims priority to Korean Patent Application No. 10-2019-0007025, filed Jan. 18, 2019, the disclosures of which are herein incorporated by reference in their entirety.

BACKGROUND

1. Field

Various embodiments of the present disclosure relate to a method, electronic device, and storage medium for updating firmware.

2. Description of Related Art

As processing speeds of mobile communication networks and processors of electronic devices such as smart phones increase, smart phones having various open operating systems and new services built therein have emerged. Such an electronic device, when circulated by a manufacturer on the market, may perform update sometimes to add a new feature to a software package like a built-in operating system or correct an error and a defect of the software package. Thus, the electronic device may download the entire changed software package over a wireless network to update the existing software package, but unlike a wired update scheme, an update time increases due to a speed limit and according to circumstances, a situation of charging a manufacturer or a user may occur. Thus, for a large-volume software package, it may be inconvenient or inefficient to transmit and install the entire new package by using update.

To address this issue, various methods for minimizing the amount of data for update have been attempted. For example, there is a differential update method for updating only a changed part of previous software. Thus, when the electronic device performs firmware update like bug fix, function improvement, etc., by the manufacturer, the electronic device may download new firmware and store the same in a storage space.

SUMMARY

As such, to support various services, the electronic device may perform update of an existing software package being used and execute a download service of new software.

However, when a problem occurs in a firmware update process, for example, when corrected software incompletely operates or does not operate at all, previous firmware may be used as recovery firmware, but a large storage space may be required for the previous firmware and the new firmware and there may be a limitation in using the storage space. Moreover, recently, items having several things, such as bug fix of a manufacturer, bug fix of an operating system provider, a security fix item, and operating system upgrade, complexly configured have been updated at a time.

Therefore, there is a need for a method for stably updating firmware while minimizing a problem occurring according to firmware update to normally perform recovery in spite of occurrence of a problem in the firmware update.

According to various embodiments, an electronic device includes a display, at least one processor, and a memory, in which the memory stores instructions that are configured, when executed, to cause the processor to control the display to output information about a plurality of update files for updating first firmware stored in a first partition area, to obtain selection related to at least one of the plurality of update files, and store second firmware obtained based on at least a part of the first firmware and the at least one first update file in a second partition area of the memory.

According to various embodiments, a method for updating firmware in an electronic device includes outputting information about a plurality of update files for updating first firmware stored in a first partition area of a memory of the electronic device, obtaining selection related to at least one first update file from among the plurality of update files and storing second firmware, obtained based on at least a part of the first firmware and the at least one first update file, in a second partition area of the memory, based on the selection.

According to various embodiments, in a storage medium having stored therein instructions, the instructions are configured to, when executed by at least one processor, cause the at least one processor to perform at least one operation including outputting information about a plurality of update files for updating first firmware stored in a first partition area of a memory of the electronic device, and obtaining selection related to at least one first update file from among the plurality of update files and storing second firmware, obtained based on at least a part of the first firmware and the at least one first update file, in a second partition area of the memory, based on the selection.

According to various embodiments, when an electronic device downloads new firmware for firmware update, a selective firmware update function regarding items desired by a user may be provided, allowing efficient firmware update.

According to various embodiments, even when the electronic device is driven with a new version of an operating system using the updated firmware, the electronic device may be recovered to the original state any time before final determination is made by the user, allowing stable firmware update.

According to various embodiments, an environment where an update item is selectable in firmware update is established in an electronic device (e.g., a smartphone), improving user convenience.

BRIEF DESCRIPTION OF THE DRAWINGS

FIG. 13 is an exemplary diagram showing contents of an update file provided from a server, according to various embodiments; and FIG. 14 is an exemplary diagram showing contents of an update file provided from a server, according to various embodiments.

DETAILED DESCRIPTION

The terms as used herein are provided merely to describe some embodiments thereof, but not to limit the scope of other embodiments of the disclosure. It is to be understood that the singular forms "a," "an," and "the" include plural references unless the context clearly dictates otherwise. All terms including technical and scientific terms used herein have the same meaning as commonly understood by one of ordinary skill in the art to which the embodiments of the disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some cases, the terms defined herein may be interpreted to exclude embodiments of the disclosure.

Figure 1:
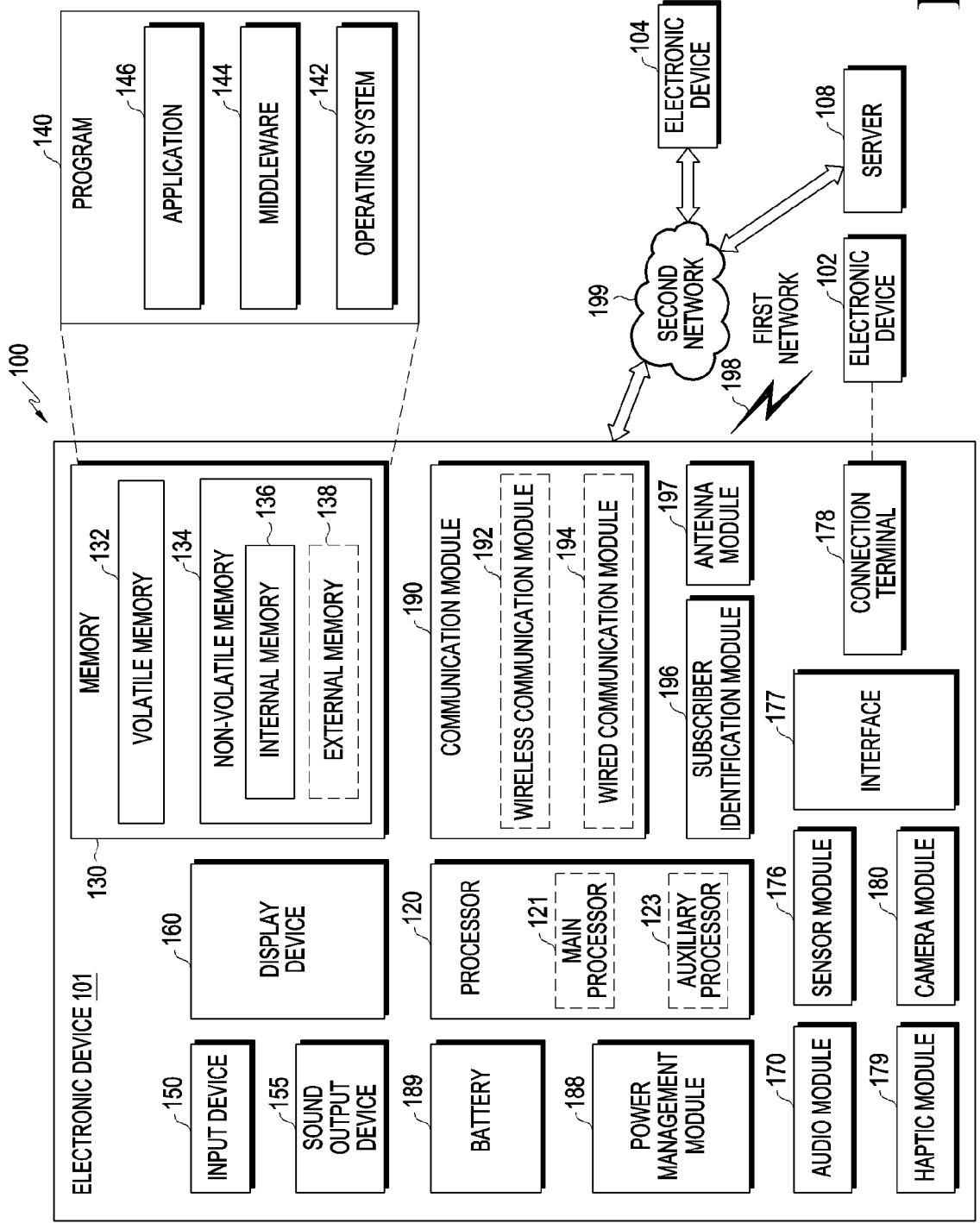
FIG. 1 is a block diagram of an electronic device in a network environment, according to various embodiments.

FIG. 1 is a block diagram illustrating an electronic device 101 in a network environment 100 according to various embodiments of the present disclosure. Referring to FIG.1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of these components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment of the present disclosure, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment of the present disclosure, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment of the present disclosure, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal or vice versa. According to an embodiment of the present disclosure, the audio module 170 may obtain the sound via the input device 150, or output the sound via the sound output device 155 or a headphone of an external electronic device (e.g., an electronic device 102) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the present disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment of the present disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment of the present disclosure, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment of the present disclosure, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment of the present disclosure, the power management module 188 may be implemented as at least part of, for example, a power management integrated circuit (PMIC).

The battery 189 may supply power to at least one component of the electronic device 101. According to an embodiment of the present disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the present disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, Wireless-Fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device). According to an embodiment of the present disclosure, the antenna module 197 may include an antenna including a radiating element composed of a conductive material or a conductive pattern formed in or on a substrate (e.g., PCB). According to an embodiment of the present disclosure, the antenna module 197 may include a plurality of antennas. In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment of the present disclosure, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the present disclosure, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment of the present disclosure, all or some of operations to be executed at the electronic device 101 may be executed at one or more of the external electronic devices 102, 104, or 108. For example, when the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
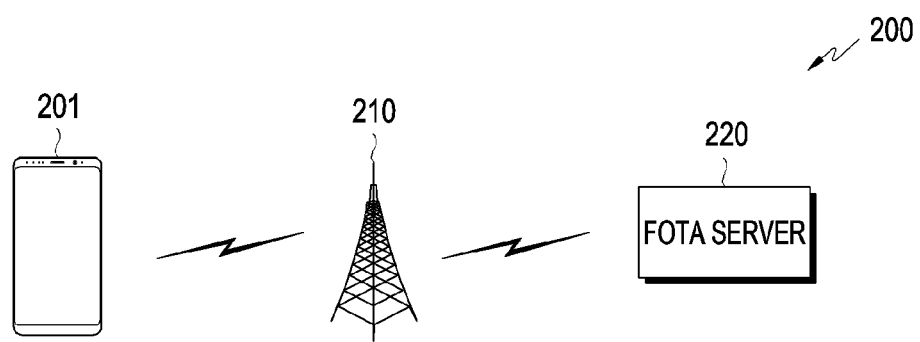
FIG. 2 is a structural diagram of a system for updating firmware according to various embodiments.

FIG. 2 is a structural diagram of a system 200 for updating firmware according to various embodiments.

Referring to FIG. 2, the system 200 for updating firmware may include an electronic device 201, a network 210, and a firmware over the air (FOTA) server 220.

The electronic device 201 may include an operating system (OS) in charge of overall operations and a boot manager, in which the boot manager may be driven to operate the operating system to be used. The operating system may be managed through firmware, and an application program may be used in an embedded environment intended to be used in the electronic device 201, e.g., an environment where an Android operating system is driven through the firmware.

The firmware may mean a program that stores a main software having no need to change data or information in a memory so as to be used like hardware, and a new version thereof may be continuously developed for stabilizing performance and fixing bugs of the electronic device 201. Thus, the firmware of the electronic device 201 may be updated with firmware of a new version. The firmware of the electronic device 201 may be updated using a wired or wireless scheme, an example of which may be an FOTA service of the wireless scheme.

The FOTA server 220 may provide a FOTA service that compares the existing firmware with the new-version firmware to provide only a part to be updated, corresponding to different parts therebetween. In the FOTA server 220, all versions regarding firmware of the electronic device 201 may be uploaded and stored by an operator of a common carrier or a manufacturer. Thus, the FOTA server 220 may generate an update file for updating the firmware of the electronic device 201 with the latest-version firmware among all updatable versions, and provide the generated update file to the electronic device 201.

When new-version firmware has emerged, the FOTA server 220 may inform the electronic device 201 of the emergence to cause the electronic device 201 to update the existing firmware. The FOTA server 220 may obtain version information regarding the current firmware in the electronic device 201 in response to an update request from the electronic device 201, and search for an update file corresponding to the electronic device 201. The FOTA server 220 may search the electronic device 201 for a newly changed update file after the current firmware.

According to various embodiments, the update file may be generated by comparing the current firmware of the electronic device 201 with the latest firmware providable by the FOTA server 220 and extracting a difference therebetween, a delta. Thus, the update file may be referred to as a delta file. In this case, the delta indicating the differences between both firmwares may include different types of data. For example, update files may be classified according to contents of data types thereof, and each update file may include at least one of data type information or address information about an address at which the update file is to be installed, such that the update files may be distinguishably indicated. The update files may be classified as described above, but various classification criteria, such as a role (or function) of the update file and a type of the update file, may also be applied, without being limited thereto.

According to various embodiments, different data types may correspond to types of patch files provided by operators of common carriers or manufacturers, and the data type information may be information for identifying a type of a patch file such as a patch file indicating operating system upgrade or a new feature, a patch file for bug fix, or a patch file for security.

As such, the FOTA server 220 may easily and rapidly update the firmware of the electronic device 201 with the final version even when there are several versions to be updated after the current version, i.e., a plurality of update files, for the firmware of the electronic device 201.

The electronic device 201 may receive at least one update file for updating firmware from the FOTA server 220 through the network 210, and update the existing firmware by using the received update file. According to various embodiments, the FOTA server 220 may identify updatable items for the firmware of the electronic device 201 and inform the user of the electronic device 201 of the updatable items. Thus, the user of the electronic device 201 may identify the updatable items and select desired items to be updated for the current firmware. The FOTA server 220 may provide all updatable items for the current firmware, i.e., the plurality of update files, to the electronic device 201, and, alternatively, may provide items selected by the user of the electronic device 201, i.e., some of the plurality of update files to the electronic device 201.

Thus, when there are a plurality of update files for the current firmware, the electronic device 201 may freely and selectively update firmware by using at least one update file based on user's selection.

According to various embodiments, when there are several update files to be updated after the current version for the firmware of the electronic device 201, the firmware may be updated differently with various combinations of update files any time before the user finalizes a firmware update item, while easily and rapidly updating the firmware with update files based on user's selection.

To this end, the plurality of update files for updating the firmware all may be downloaded in a user storage area. Thus, the current firmware may be updated using the plurality of update files of the user storage area, but to download the plurality of update files, a part of the user storage area needs to remain empty in advance. However, the user storage area is a storage area assigned to store data generated by use of the electronic device 201, e.g., user data such as captured pictures or moving images, etc., and thus for a case where firmware update is not performed for a long time, a very large space may be required, limiting the utilization of the user storage area.

Hence, the electronic device 201 according to various embodiments may download an update file in a separate partition area instead of the user storage area to update the firmware, and a firmware update process using the partition area will be described in detail below. "Partition" and "partition area" can be used interchangeably.

Figure 3:
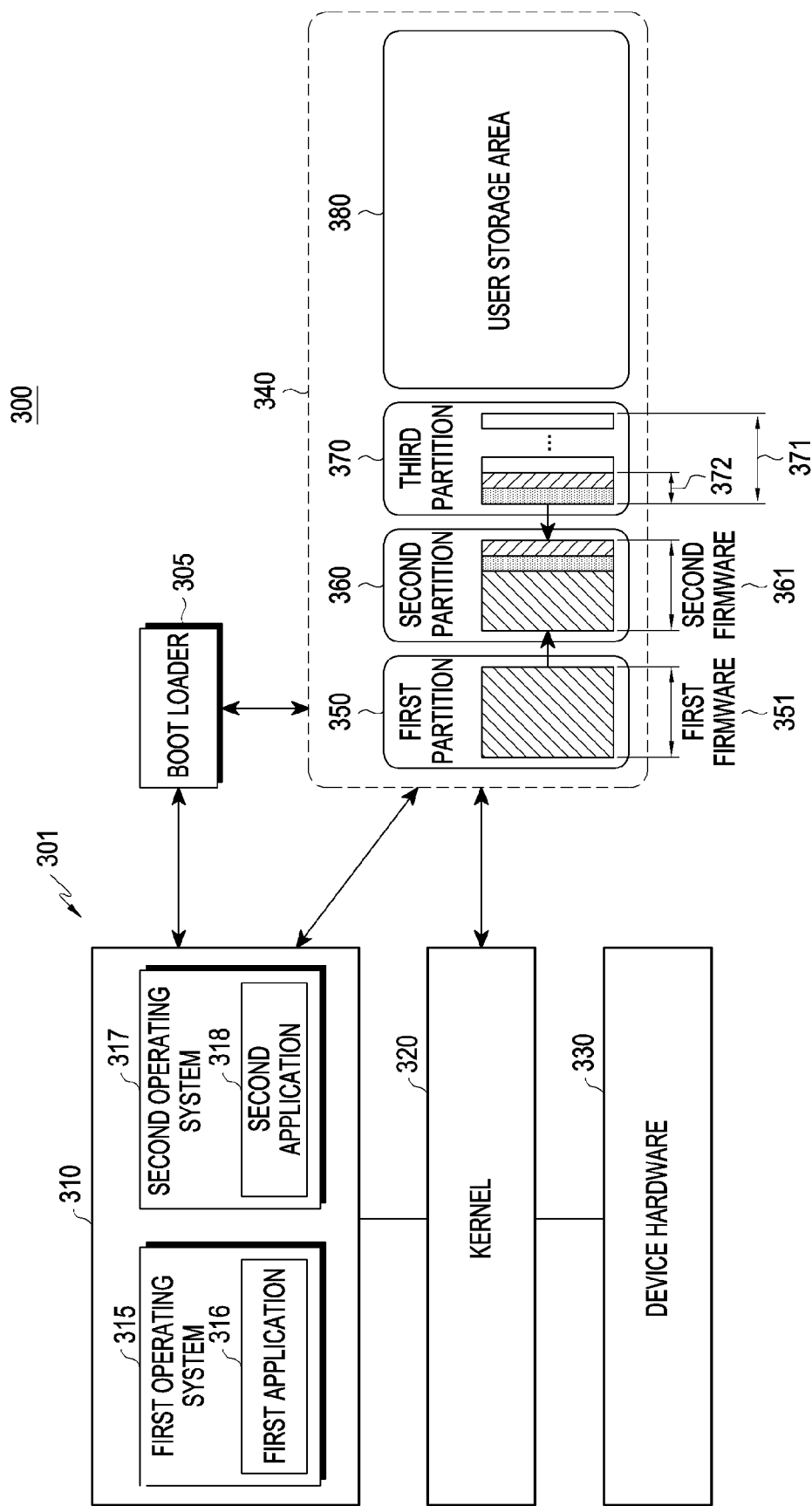
FIG. 3 is a view showing an example of detailed components of an electronic device for updating firmware, according to various embodiments.

FIG. 3 is a view 300 showing an example of detailed components of an electronic device for updating firmware, according to various embodiments.

Referring to FIG. 3, an electronic device 301 may include a boot loader 305, an operating system 310 including a plurality of operating systems, a kernel 320, and device hardware 330. The operating system 310 may include the plurality of operating systems, e.g., a first operating system 315 and a second operating system 317.

According to an embodiment, the operating system 310 may include one or more operating systems in which the first operating system 315 may be referred to as a host operating system that is a main operating system operating upon booting of the electronic device, and the second operating system 317 may be referred to as a guest operating system. For example, the first operating system 315 may be an embedded environment intended to be used in the electronic device 301, e.g., an Android operating system, and may include a first application 316. The second operating system 317 may include a second application 318. Herein, the first application 316 may include at least one application operable in the Android operating system, and may be referred to as an application program. For example, the first application 316 may include various applications operable based on the Android operating system, such as a video play application, a web browser application, etc.

The kernel 320 may assign resources of the electronic device 301 by connecting and managing interaction between physical components of the device hardware 330 and separate middleware of the operating system 310, e.g., the first operating system 315. For example, the kernel 320 may include at least one of a security function, a driver function for accessing components of the device hardware 330 of the electronic device 301, or a file system function for storing and managing files.

The device hardware 330 may include various hardware devices. The device hardware 330 may include devices coupled with a processor (e.g., the processor 120 of FIG. 1) configured to perform various functions and operations. According to various embodiments, the device hardware 330 may include at least one hardware component, a processor (e.g., a central processing unit (CPU)), and a memory (e.g., random access memory (RAM)). The device hardware 330 may further include various other components and resources such as other input devices like a keyboard, a mouse, and/or a touch screen, output devices like an audio device, a speaker, and/or a display, or an external storage device.

To load the operating system 310 in the electronic device 301, the boot loader 305 may initiate an operation first. The boot loader 305 may perform initialization of the CPU, the RAM, and the device hardware 330, and perform downloading through the kernel 320. According to an embodiment, the boot loader 305 may be included in the memory of the electronic device 301, and the memory may include at least one of a booting area such as the boot loader 305, a user storage area for storing operating system information required for driving the system of the electronic device 301 and storing user data, or a storage area for an update file for updating firmware.

According to various embodiments, an operation of booting the electronic device 301 may include stages described below. The electronic device 301 may be executed in response to a power-on signal of the electronic device 301 to obtain control over program execution. The electronic device 301 may then drive an operating system with reference to data of a partition where newly updated firmware is stored, through the boot loader 305. The boot loader 305 may indicate a second partition where the newly updated firmware is stored, rather than a first partition where the existing firmware is stored, such that application programs of the operating system may be executed on the second partition.

According to various embodiments, an inside 340 of the memory of the electronic device 301 may be divided into a plurality of partition areas 350, 360, and 370 as well as a user storage area 380. The plurality of partition areas 350, 360, and 370 may be areas that are configured such that the electronic device 301 recognizes as if there are several firmwares, like the first partition area 350 in which the current firmware is stored and the second partition area 360 in which newly configured firmware is stored. According to an embodiment, each of the partition areas 350 and 360 may separately store data such as existing firmware 351 and second firmware 361 that is newly configured by at least a part 372 of the entire update file 371 based on user's selection.

Each of the first partition area 350 and the second partition area 360 may be managed separately, such that an environment where an operating system is driven based on firmware of any one of the partition areas 350 and 360 may be provided. According to an embodiment, newly configurable firmware may include two or more firmware such as the second firmware and the third firmware, depending on a combinable number of update files.

For example, when the operating system is driven based on the firmware of the second partition area 360, the firmware of the first partition area 350 may be configured not to be deleted, but not to be referred to. However, upon occurrence of a problem when the user uses an application of the electronic device 301 in a state where the operating system of the electronic device 301 is driven based on new firmware of the second partition area 360, the applied state of the new firmware may be returned to the previous state. In this case, the firmware of the first partition area 350 may be referred to and the firmware of the second partition area 360 may be deleted.

In addition, downloaded update files are stored in the third partition area 370, such that when the user reselects at least some of the update files, the selected some update files and the first firmware of the first partition area 350 may be copied to the second partition area 360. As such, by applying (or overwriting) the selected some update files to the first firmware copied to the second partition area 360, it may be possible to perform update the first firmware with new firmware that is different from a previous version.

Figure 4:
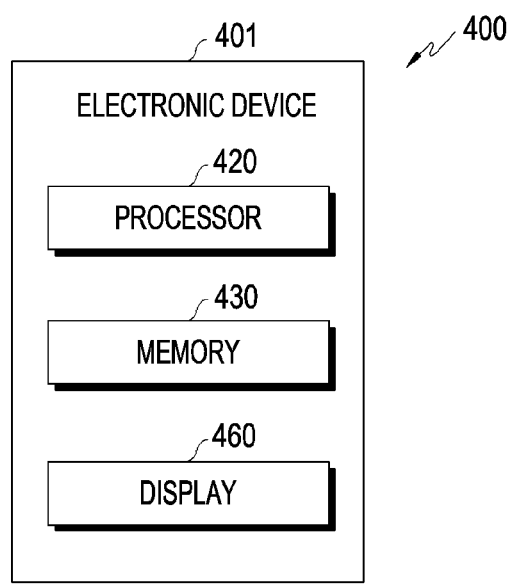
FIG. 4 is an internal block diagram of an electronic device according to various embodiments.

FIG. 4 is an internal block diagram 400 of an electronic device according to various embodiments.

Referring to FIG. 4, an electronic device 401 (e.g., the electronic device 101 of FIG. 10 according to various embodiments), as a device (e.g., a smartphone or a tablet computer) which controls execution of firmware update, may include at least one processor 420 (e.g., the processor 120 of FIG. 1), a memory 430 (e.g., the memory 130 of FIG. 1), and a display 460 (e.g., the display device 160 of FIG. 1). Herein, all components shown in FIG. 4 are not essential components of the electronic device 401, and more components or less components than those shown in FIG. 4 may be used to implement the electronic device 401.

The memory 430 may store instructions for, when executed, controlling the at least one processor 420 to perform various operations.

The memory 430 may include a booting area, like a boot loader, which boots the electronic device 401 in a configuration of the electronic device 401. The memory 430 may include at least one storage area that stores at least one of operating system information required for driving the system of the electronic device 401, user information stored by a user, firmware update information, or security information required for security of the electronic device 401.

According to various embodiments, the inside of the memory 430 may be divided into a plurality of partition areas. Herein, in the plurality of partition areas, at least one of different programs and information may be stored separately.

According to various embodiments, the memory 430 may store first firmware used to prepare for the system for loading the operating system. In an embodiment, the inside of the memory 430 may include a first partition area that stores the first firmware. Herein, the first firmware may be existing firmware in the electronic device 401.

According to various embodiments, at least one partition area corresponding to at least one update file or combination of update files for updating the first firmware may be generated.

According to various embodiments, the at least one update file may be classified according to different data types between the current firmware of the electronic device 401 and the latest firmware, and may include at least one file classified according to a data type. The at least one update file may include at least one of identification information for allowing the electronic device 401 to distinguishably indicate different data types or address information about addresses at which the update files of the different data types are to be installed. According to an embodiment, the update file may be referred to as a delta file.

According to various embodiments, an example of an update file that may be classified according to different data types may include a patch file provided by an operator of a common carrier or a manufacturer, and the identification information may include information for identifying a type of a patch file, such as a patch file indicating operating system upgrade or a new feature, a patch file for bug fix, or a patch file for security.

For example, the electronic device 401, when updating the first firmware, may provide a user interface through which the user may select an update item, in which at least one partition area may be generated corresponding to the update item, i.e., a data type, selected through the user interface. Thus, data regarding update items selectable by the user may be stored in the at least one of the plurality of partition areas to update the first firmware.

The processor 420 may manage partitioning to update firmware and load updated firmware in a designated partition, thus loading the updated firmware when the system is booted.

The processor 420 may control the display 460 to output information about a plurality of update files for updating the first firmware stored in the first partition area of the memory 430. For example, when receiving a plurality of update files including at least one data type for updating the original first firmware, the processor 420 may output information about the plurality of update files through the display 460 to allow the user to select a desired item to be updated.

According to various embodiments, when receiving the plurality of update files including the at least one data type for updating the first firmware, the processor 420 may download a received update file in a third partition area of the memory 430. Herein, the third partition area may be different from the user storage area, in which any one of the plurality of partition areas may be previously assigned to download an update file or may be generated upon occurrence of a situation requiring reception of an update file.

According to an embodiment, each partition area may be assigned with any resources required for operating like an independent operating system such as a kernel, a framework, or an application. For example, the first firmware supporting and enabling establishment and execution of an operating system based on the first firmware may be stored in the first partition area. The second firmware in which an update file is applied to the first firmware may be stored in the second partition area to establish and execute an operating system based on the second firmware that is updated from the first firmware.

According to various embodiments, the processor 420 may receive selection related to at least one of the plurality of update files output through the display 460. The processor 420 may store instructions for storing the second firmware obtained based on at least a part of the first firmware and the at least one update file in the second partition area of the memory 430, based on user selection regarding the at least one update file. For example, update with the second partition may be performed merely by copying the at least one update file to the entire first firmware or a part thereof.

The processor 420 may load updated firmware in a partition area newly assigned for firmware update, thus loading the updated firmware when the system is booted. The processor 420 may perform system rebooting to activate the updated firmware.

The processor 420 may attempt booting with updated firmware stored in a designated partition to replace the original firmware with the updated firmware during system rebooting. Thus, during system rebooting, the operating system may be loaded upon power on such that a series of hardware initialization stages may occur until system control is achieved.

According to various embodiments, the memory 430 may store instructions that are configured, when executed, to cause the processor 420 to control the display 460 to output information about a plurality of update files for updating first firmware stored in a first partition area, to obtain selection related to at least one of the plurality of update files, and store second firmware obtained based on at least a part of the first firmware and the at least one first update file in a second partition area of the memory.

According to various embodiments, the instructions may be configured to cause the processor 420 to drive an operating system with reference to the second firmware stored in the second partition area, after rebooting according to completion of update of the first firmware.

According to various embodiments, the instructions may be configured to cause the processor 420 to download the plurality of update files in a third partition area of the memory.

According to various embodiments, the instructions may be configured to cause the processor 420 to obtain selection related to at least one second update file from among the plurality of update files and store third firmware obtained based on at least a part of the first firmware and the at least one second update file in a fourth partition area of the memory.

According to various embodiments, the instructions may be configured to cause the processor 420 to drive the operating system with reference to the third firmware stored in the fourth partition area, after rebooting according to completion of update of the first firmware.

According to various embodiments, the at least one first update file may be configured as a combination corresponding to a user input for the selection from among the plurality of update files.

According to various embodiments, the instructions may be configured to cause the processor 420 to obtain selection related to at least one third update file from among the plurality of update files in response to a request for changing the second firmware, and replace the second firmware stored in the second partition area of the memory with fourth firmware obtained based on the at least a part of the first firmware and the at least one third update file.

According to various embodiments, the instructions may be configured to cause the processor 420 to drive the operating system with reference to the first firmware stored in the first partition area, after rebooting in response to a request for recovering the first firmware.

According to various embodiments, information about the plurality of update files for updating the first firmware may include at least one of operating system upgrade, addition of a new feature, bug fix, or a security fix item.

According to various embodiments the instructions may be configured to cause the processor 420 to output the information about the plurality of update files for updating the first firmware on the display upon receiving an update request from a server that provides the plurality of update files, and to download the at least one first update file among the plurality of update files.

Figure 5:
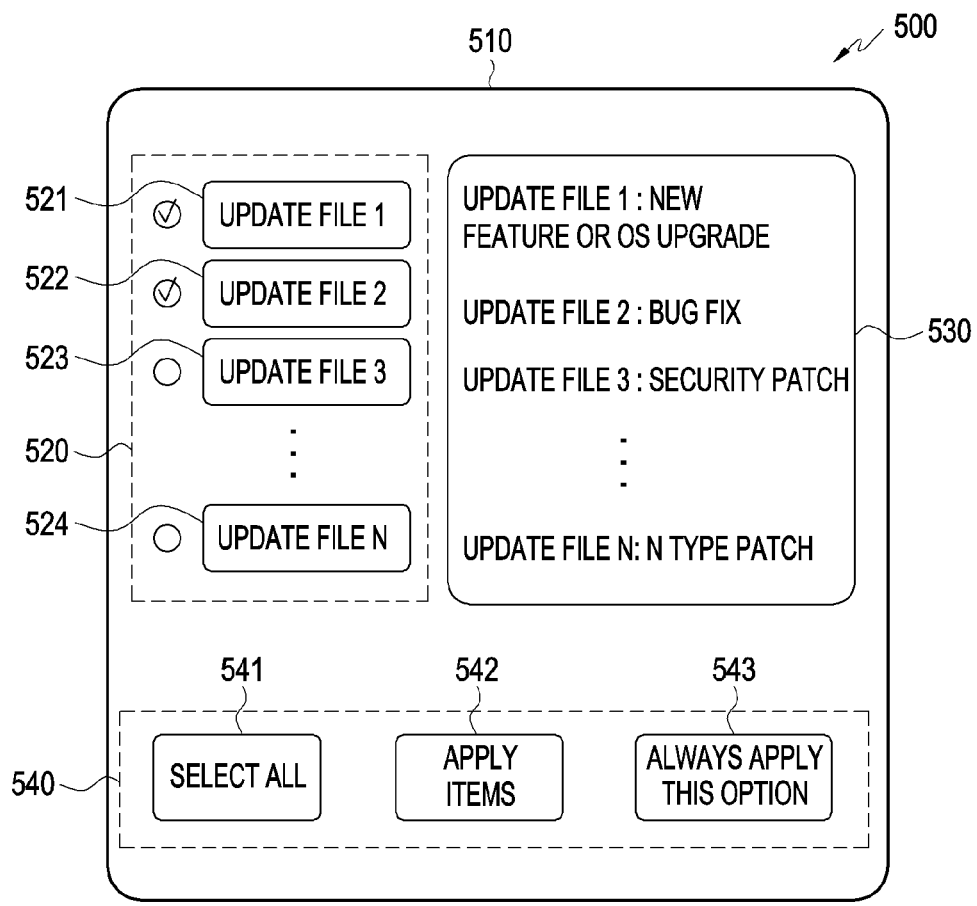
FIG. 5 is an exemplary diagram showing a screen for selecting an update file, according to various embodiments.

FIG. 5 is an exemplary diagram 500 showing a screen for selecting an update file, according to various embodiments.

Referring to FIG. 5, an electronic device (e.g., the electronic device 401 of FIG. 4) may receive selection regarding items for firmware update from the user through an update file selection screen 510 displayed on a display (e.g., the display 460 of FIG. 4).

As shown in FIG. 5, the update file selection screen 510 may include at least one of a list 520 of a plurality of selectable update files, description 530 of each update file, or selection options in button area 540 for the plurality of update files implemented with buttons 541-543.

For example, a message asking whether to proceed firmware update may be displayed on the display, and when the user selects to proceed, a plurality of update files 521, 522, 523, and 524 classified as various data types for firmware update may be displayed. In this case, the description 530 of each update file may be displayed together to help the user with understanding of the plurality of update files.

For example, the description may be displayed describing that Update File 1 is a patch file indicating operating system upgrade or a new feature, Update File 2 is a patch file for bug fix of an existing used function, Update File 3 is a patch file for security, and Update File N is an N-type patch file. By referring to the description 530, the user may select a desired update file among the plurality of update files. For example, as shown in FIG. 5, the user may select a desired update file by using any one of a button 541 for selecting all update files, a button 542 for applying a selected update file, and a button 543 for applying a selected option at all times and select application. Herein, various selection options regarding a plurality of update files in addition to the illustration in a button area 540 may be implemented.

As such, the electronic device may perform firmware update using selected some update files in response to the user's selection.

Figure 6:
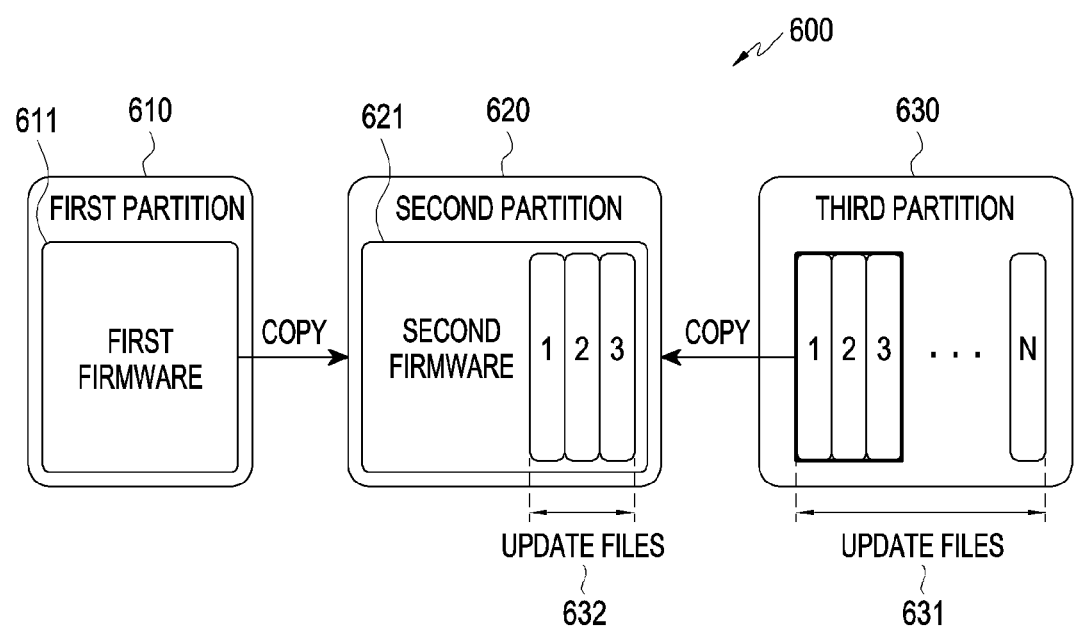
FIG. 6 is a view showing a configuration of a plurality of partition areas according to various embodiments.

FIG. 6 is a view 600 showing a configuration of a plurality of partition areas according to various embodiments.

In FIG. 6, a memory including a plurality of partition areas capable of separately storing existing firmware and new firmware is illustrated. A first partition area 610, a second partition area 620, and a third partition area 630 are independent partitions, respectively, in which the first partition 610 may be used to load a first operating system under first firmware 611 corresponding to firmware before update, i.e., existing firmware, and the second partition 620 may be used to load the first operating system under second firmware 621 corresponding to firmware updated from the first firmware 611.

For example, the first partition 610 may be an operating system partition being used based on the existing firmware, the second partition 620 may be an operating system partition newly configured by copying some update files 632 selected by the user, and the third partition 630 may be a downloading partition for a plurality of update files 631 for updating the first firmware.

According to various embodiments, the firmware may be stored in the memory in different firmware forms such as the current firmware in the electronic device and firmware updated based on a combination of update files based on user's selection, and booting may be performed based on any one firmware.

Herein, the second firmware 621 may be updated from the first firmware, which is generated by applying the some update files 632, moved (or copied) to the second partition 620 corresponding to user's selection from among the plurality of update files 631 of the third partition 630, to a part of the first firmware 611 moved (or copied) from the first partition 610 to the second partition 620. Alternatively, update may be performed merely with an operation of copying at least a part of the first firmware 611 from the first partition 610 and the some update files 632 from the third partition 630 to the second partition area 620.

Thus, the existing operating system under the first firmware 611 may be loaded for use on the first partition 610, and the new operating system under the second firmware 621 updated from the existing operating system may be loaded for use on the second partition 620.

Meanwhile, as shown in FIG. 6, all the update files 631 other than the update file combination 632 selected by the user are stored in the third partition area 630, such that until the user finally determines use of the second firmware 621, the existing first firmware 611 may be updated with new firmware that is different from the second firmware 621 by using a new update file combination.

For example, in firmware update based on the update file combination 632 selected by the user, when the update is intermediately stopped due to an error of some update files or processing is forcedly terminated after the update, then new update files may be selected from among the update files 631, excluding the problematic some update files, thus constituting the second partition 620.

For example, the user may request change of the second firmware, and the electronic device may display information about all the update files 631 stored to be selected by the user with reference to the third partition 630 on the screen, in response to a request for changing the second firmware. The electronic device may obtain selection regarding at least one of all the stored update files 631 from the user. In this case, the at least one update file selected may include a file that differs from or partially overlaps with previous selection. In response to the selection, the electronic device may replace the second firmware 621 stored in the second partition area 620 with firmware newly configured by applying the selected at least one file to a part of the first firmware. That is, the second partition area 620 may be used for newly configured firmware.

As such, by storing the plurality of update files in the third partition area 630 instead of the user storage area, the electronic device may configure the second partition 620 for new firmware corresponding to a combination of several update files by using the plurality of update files stored in the third partition area 630 without a need to download the update file with a combination corresponding to user selection.

Figure 7:
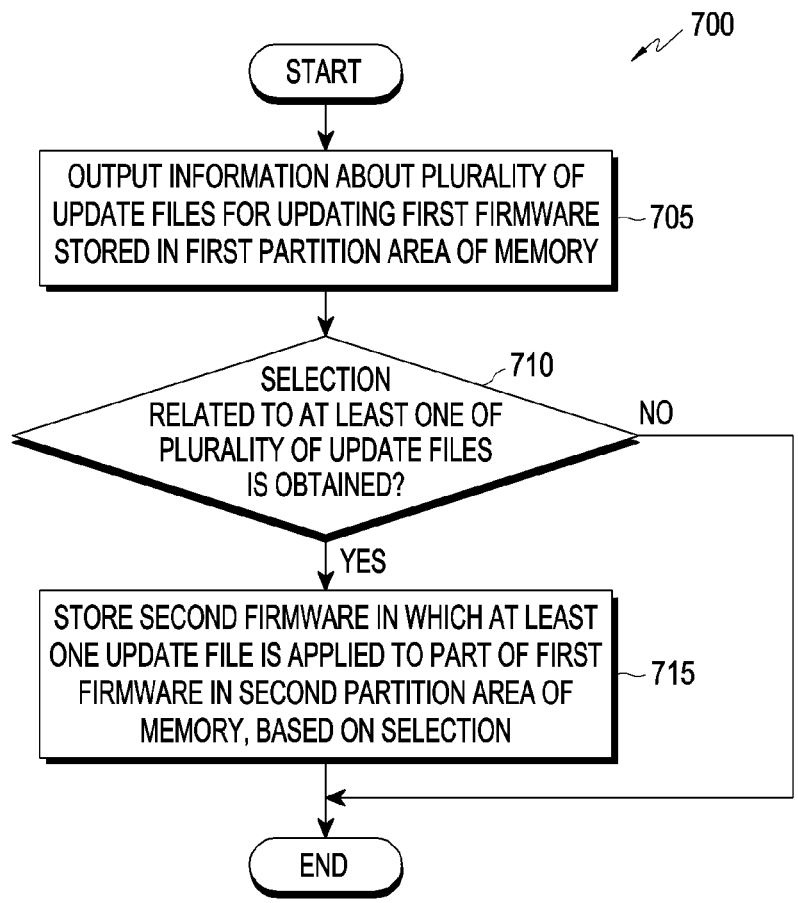
FIG. 7 is a flowchart of an operation of updating firmware in an electronic device, according to various embodiments.

FIG. 7 is a flowchart 700 of an operation of updating firmware in an electronic device, according to various embodiments.

Referring to FIG. 7, an operation method may include operations 705 through 715. Steps/operations in the operation method may be performed by at least one of the electronic device (e.g., the electronic devices 101 and 401 of FIGS. 1 and 4) or at least one processor (e.g., the processors 120 and 420 of FIGS. 1 and 4) of the electronic device. In an embodiment of the present disclosure, at least one of operations 705 through 715 may be omitted, an order of some of them may be changed, or other operations may be added.

Referring to FIG. 7, firmware update may start in response to a request from a server (e.g., the FOTA server 220 of FIG. 2) that provides an update file or a request from the electronic device 401.

In operation 705, in response to a request for firmware update, the electronic device 401 may control the display 460 to output information about a plurality of update files for updating the first firmware stored in the first partition area of the memory 430.

According to various embodiments, the operation method may further include downloading the plurality of update files in the third partition area of the memory.

According to an embodiment, the electronic device 401 may download a plurality of update files regarding updatable items for the first firmware from the server and output information regarding the plurality of update files. For example, the electronic device 401 may analyze the plurality of update files through information regarding firmware to be downloaded from the server, and obtain information about a type of an update file and an item for which update is to be performed, for each update file.

According to an embodiment, after outputting the information regarding the plurality of update files, the electronic device 401 may perform downloading for the plurality of update files in response to user selection of any one of items such as 'later', 'install now', 'install at night', etc.

According to various embodiments, the operation method may further include receiving an update request from the server that provides the plurality of update files and downloading the at least one first update file out of the output information regarding the plurality of update files, based on the selection.

For example, the plurality of update files may be downloaded at a time, but upon receiving the update request from the server, the electronic device 401 may output the information regarding the plurality of update files for updating the first firmware on the display 460 and then download the at least one first update file among the plurality of update files based on user selection. Thus, some update files selected by the user among the plurality of update files may be downloaded, and the selected some update files may be stored in a separate partition area.

According to various embodiments, the plurality of update files may be downloaded at a time in the third partition area of the memory 430. When the user selects downloading for the some update files, the selected some update files may be downloaded in the third partition area. Herein, the third partition area may be an empty storage area for firmware update, which is allocated for downloading or an area newly allocated for downloading, and may be an area other than the user storage area not to limit the use of the user storage area.

According to various embodiments, information about the plurality of update files for updating the first firmware may include at least one of operating system upgrade, addition of a new feature, bug fix, or a security fix item.

In operation 710, the electronic device 401 may obtain selection related to the at least one first update file among the plurality of update files. Herein, the at least one first update file may include a combination corresponding to a user input for the selection from among the plurality of update files. For example, after downloading the plurality of update files, the electronic device 401 may display information about updatable items through the display 460 and wait for user selection of at least one of the updatable items.

In operation 715, the electronic device 401 may store second firmware in which the at least one first update file is applied to a part of the first firmware in the second partition area of the memory, based on the selection. Alternatively, the electronic device 401 may store the second firmware, obtained based on at least a part of the first firmware and the at least one first update file, in the second partition area of the memory.

Herein, the second firmware updated by overwriting the at least one first update file onto the entire first firmware or a part thereof may be obtained. Such an overwriting operation may be performed on the second partition area, and the second firmware generated by overwriting onto the second partition area may be stored.

According to various embodiments, the operation method may further include driving an operating system with reference to the second firmware stored in the second partition area, after rebooting according to completion of update of the first firmware.

According to various embodiments, an operation of storing the second firmware in the second partition area of the memory may include obtaining the second firmware by copying the at least one first update file among the plurality of update files downloaded in the third partition area and the first firmware stored in the first partition area to the second partition area, based on the selection.

Thus, the electronic device 401 may drive an operating system (OS) with reference to the second firmware stored in the second partition area, after rebooting corresponding to completion of update of the first firmware. As such, according to various embodiments, firmware update based on a combination of update files corresponding to user selection may be possible, and upon occurrence of an error or inconvenience in use when the user uses an application based on the updated firmware, currently used firmware may be updated into another configuration with another combination of update files.

According to various embodiments, the operation method may further include obtaining selection related to at least one second update file from among the plurality of update files and storing third firmware obtained based on at least a part of the first firmware and the at least one second update file in a fourth partition area of the memory.

According to various embodiments, the operation method may further include driving an operating system with reference to the third firmware stored in the fourth partition area, after rebooting corresponding to completion of update of the first firmware.

For example, when the user requests change of the second firmware or desires another combination of update files, the electronic device 401 may display information regarding the plurality of update files downloaded on the screen and obtain selection related to at least one second update file corresponding to the other combination from the user. In this case, firmware update corresponding to a new combination may be performed in the fourth partition area separately from the second partition area in which the second firmware is stored. When the user selects final confirmation to continuously use the newly configured firmware on the fourth partition area, the firmware of the second partition area may be removed and the firmware of the fourth partition area may be maintained until the next update.

According to various embodiments, the operation method may further include obtaining selection related to at least one third update file from among the plurality of update files in response to a request for changing the second firmware, and replacing the second firmware stored in the second partition area of the memory with fourth firmware obtained based on the at least a part of the first firmware and the at least one third update file.

For example, when the user requests change of the second firmware, the electronic device 401 may display information regarding the plurality of update files downloaded on the screen and obtain selection related to at least one third update file corresponding to the other combination from the user. At this time, the newly partition area may be configured based on selection related to the at least one third update file, but the second partition area in which the second firmware is stored may be configured to be used for new firmware. In this case, the second firmware stored in the second partition area may be replaced with the fourth firmware updated by application of the at least one third update file.

According to various embodiments, the operation method may further include driving an operating system with reference to the first firmware stored in the first partition area after rebooting, in response to a request for recovering the first firmware.

Figure 8:
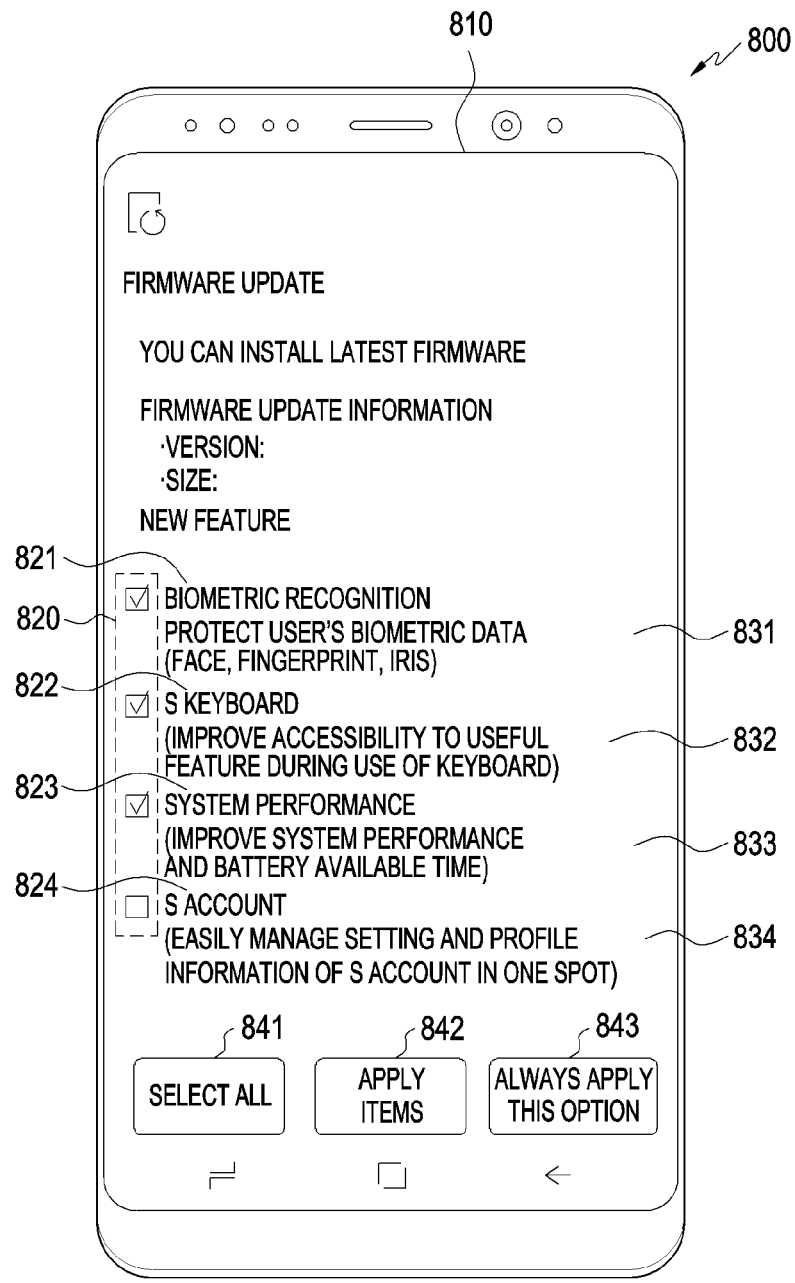
FIG. 8 is an exemplary diagram showing a screen for a firmware update-related item, according to various embodiments.

FIG. 8 is an exemplary diagram 800 showing a screen for a firmware update-related item, according to various embodiments.

Referring to FIG. 8, the electronic device 401 may display a guide screen 810 for firmware update in response to a push message for firmware update from a server (e.g., the FOTA server 220).

The update guide screen 810 may include updatable items 821, 822, 823, and 824 and related descriptions 831, 832, 833, and 834 regarding respective update items, together with a guide message indicating that the latest firmware is installable.

Such an update guide screen 810 may be immediately displayed in response to the push message for firmware update, and may be displayed in a preset period (e.g., a period of one day or seven days) to inform to the user that firmware update is possible.

The user may identify items to be updated for the current firmware through the update guide screen 810 and select at least one item, for example, with a touch input using a touch box 820. FIG. 8 shows, for each update file, titles of the items 821, 822, 823, and 824 to be updated, such as biometric recognition, S keyboard, system performance, S account, etc., and descriptions 831, 832, 833, and 834 regarding update to be performed for the respective items. Items such as performance improvement of a function installed in the electronic device 401, operating system upgrade, etc., are shown in FIG. 8, but various items such as addition of a new feature, bug fix, or a security fix item may be added.

According to an embodiment, when the user desires to update all items, the user may select a 'Select All' button 841. When firmware update is determined to be performed on all the items, firmware update using update files corresponding to respective items may start.

When the user desires to update selected items, the user may select a 'Apply Items' button 842. For example, when the user is not satisfied with update contents while currently using the 'S Account' item 824, the user may select update for the other items than the 'S Account' item 824. When firmware update is determined to be performed on some selected items, firmware update using update files corresponding to the selected items may start.

According to an embodiment, when the user desires update for the selected items in the next firmware update, the user may select a 'Always Apply This Option' button 843. For example, when firmware update is performed for the biometric recognition item 821, the S keyboard item 822, and the system performance item 823 by selecting the 'Always Apply This Option' button 843, update may be performed for previous selected items, e.g., the biometric recognition item 821, the S keyboard item 822, and the system performance item 823, in the next firmware update. As such, the foregoing selection may be maintained unless the user does not change selection for update items. Thus, a necessary part in firmware update may be selectively updated and such selection may also be maintained, thereby allowing continuous update appropriate for a user's purpose.

Figure 9A:
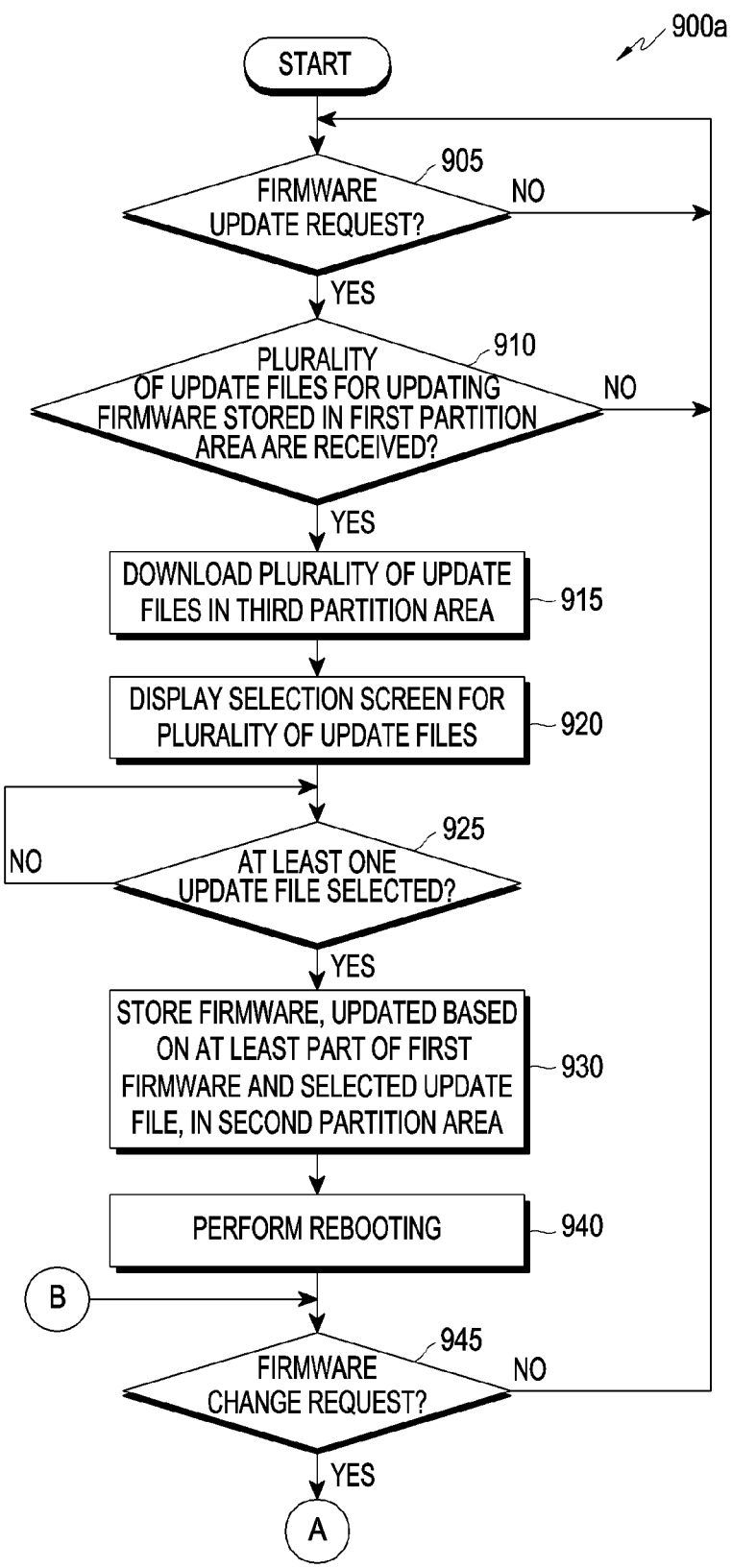
FIG. 9A is a flowchart of an operation of updating firmware in an electronic device, according to various embodiments.
Figure 9B:
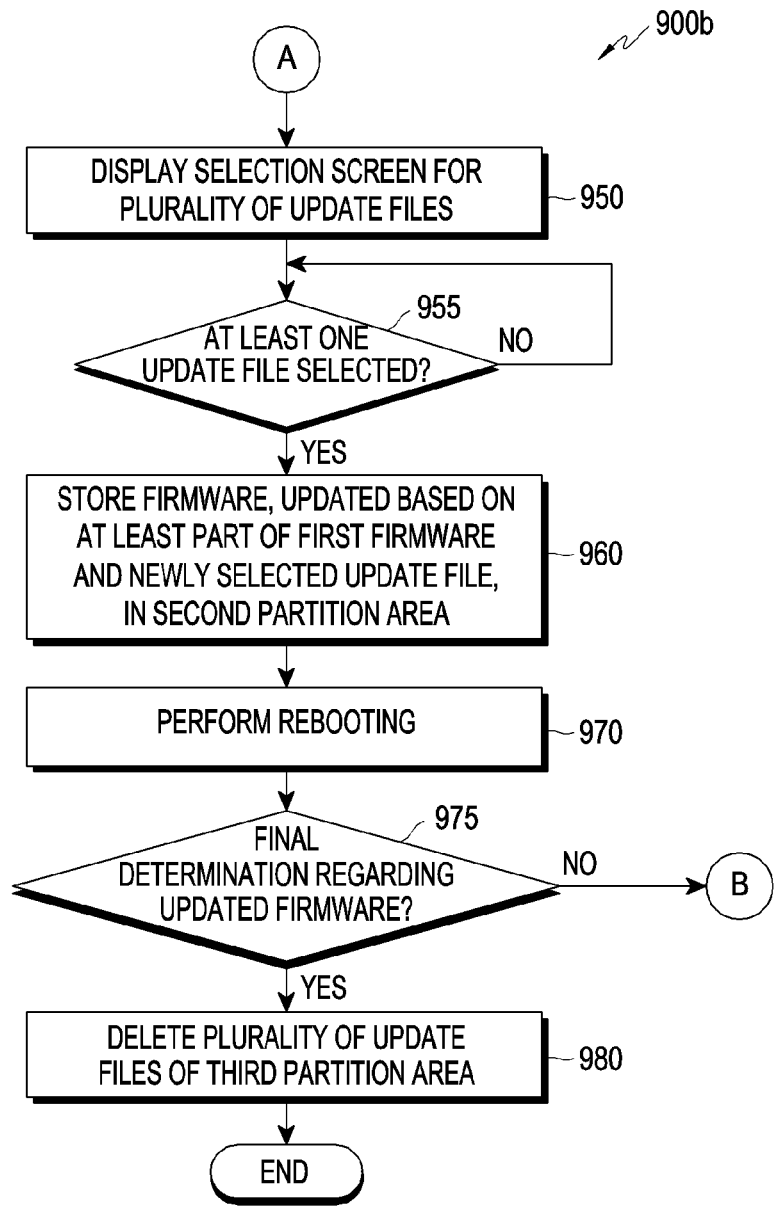
FIG. 9B is a flowchart of an operation continuing from the operation of FIG. 9A.

FIG. 9A is an operation flowchart 900a for firmware update in an electronic device according to an embodiment, and FIG. 9B is an operation flowchart 900b continuing from operations of FIG. 9A.

Referring to FIGS. 9A and 9B, an operation method may include operations 905 through 980. Steps/operations in the operation method may be performed by at least one of the electronic device (e.g., the electronic devices 101 and 401 of FIGS. 1 and 4) or at least one processor (e.g., the processors 120 and 420 of FIGS. 1 and 4) of the electronic device. In an embodiment, at least one of operations 905 through 980 may be omitted, an order of some of operations 905 through 980 may be changed, or other operations may be added.

According to various embodiments, the electronic device 401 may determine whether there is a firmware update request in operation 905. Operation 905 may be repeatedly performed until reception of the firmware update request. The firmware update request may include a user's update request through a display (e.g., the display 460 of FIG. 4) for firmware to be updated, a request received in the form of a push message from a server (e.g., the FOTA server 220 of FIG. 2) that provides an update file, or advent of a preset update period (e.g., a period of one day or seven days).

Upon reception of the firmware update request, the electronic device 401 may access the server in response to reception of the firmware update request to request update for the current firmware of the electronic device 401. In this case, in order to be provided with an update file for the latest firmware from the server, the electronic device 401 may provide information about a registered electronic device such as version information of the current firmware or identification information of the electronic device 401 to the server.

The server may identify all updatable items for the firmware to be updated, based on the information about the electronic device provided from the electronic device 401 to generate at least one update file corresponding to respective items for each of the updatable items, and deliver the generated at least one update file to the electronic device 401, for example, in a push manner. Herein, the at least one update file may be generated for each updatable item, e.g., each data type. The update file provided from the server for user selection with respect to the update files may be two or more.

In operation 910, the electronic device 401 may identify whether the plurality of update files for updating the first firmware, which is an update target, stored in the first partition area are received from the server. When the plurality of update files are received, the electronic device 401 may download the plurality of update files in the third partition area in operation 915. Herein, the third partition area may be an empty storage area other than the user storage area, which is allocated for downloading, or may be an area generated for downloading.

According to an embodiment, the plurality of update files from the server may be received without user selection in a manner such as push, pull, or polling, and alternatively, upon reception of user selection after waiting for user selection, the plurality of update files may be downloaded.

The electronic device 401 may display a selection screen for the plurality of update files in operation 920, and identify whether at least one of the plurality of update files is selected in operation 925. For example, the user may identify update items corresponding to the plurality of update files displayed on the screen and designate desired update items.

In operation 930, the electronic device 401 may store firmware, updated based on at least a part of the first firmware and the selected at least one update file, in the second partition area in response to selection of the at least one update file. As such, by overwriting (or copying) an update file to the entire existing firmware or a part thereof, the existing firmware may be updated. In this case, to generate updated firmware having the same structure as the first firmware stored in the first partition area, the first firmware of the first partition area may also be moved (or copied) to the second partition area, and the entire first firmware or a part thereof, i.e., a part to be updated may be updated using the selected at least one update file.

In operation 940, the electronic device 401 may drive an operating system based on updated firmware of the second partition area by performing rebooting. In this case, when the user does not determine whether to continuously use the updated firmware, firmware update using another combination of update files may be possible anytime.

In operation 945, the electronic device 401 may identify whether the firmware change request is received. When there is no firmware change request, the electronic device 401 may return to operation 905 to operate based on the updated firmware, i.e., the second firmware, until the next firmware update is performed. On the other hand, when there is a firmware change request, for example, the user determines not to use the currently updated firmware, the electronic device 401 may perform operation 950 of FIG. 9B.

The electronic device 401 may display a selection screen for a plurality of update files downloaded in the third partition area in operation 950, and identify whether at least one update file is selected in operation 955. For example, the user may select again update items corresponding to the plurality of update files displayed on the screen.

In operation 960, the electronic device 401 may store firmware, updated based on at least a part of the first firmware and the newly selected at least one update file, in the second partition area. As such, merely by copying the at least a part of the first firmware and the newly selected at least one update file to the second partition area, firmware update may be performed and rebooting may be performed in operation 970 after the firmware update. Operations 960 and 970 for update are the same as operations 930 through 945 of FIG. 9A, and thus will not be described in detail.

In operation 975, the electronic device 401 may identify whether final determination regarding the updated firmware is obtained. When final determination regarding the updated firmware is not obtained, the electronic device 401 may proceed to operation 945 of FIG. 9A to repeat the foregoing operations. On the other hand, when the updated firmware is determined by the user to be continuously used, the updated firmware does not need to be changed any longer, such that the electronic device 401 may delete the plurality of update files of the third partition area in operation 980. The first firmware of the first partition area is stored such that even when downgrade to the previous version is desired or a problem occurs during the use of the updated firmware, recovery may be possible anytime.

Figure 10A:
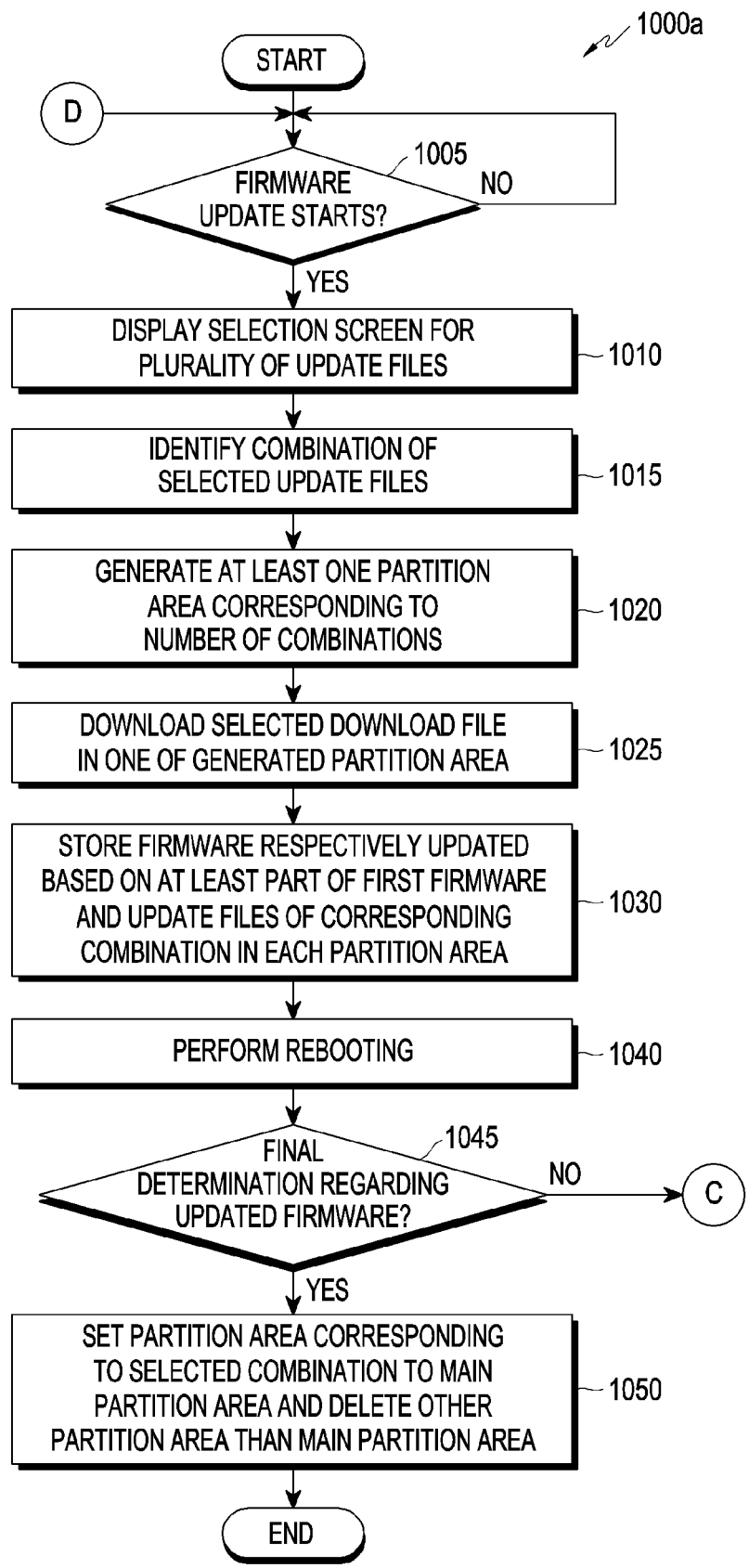
FIG. 10A is a flowchart of an operation of updating firmware in an electronic device, according to various embodiments.
Figure 10B:
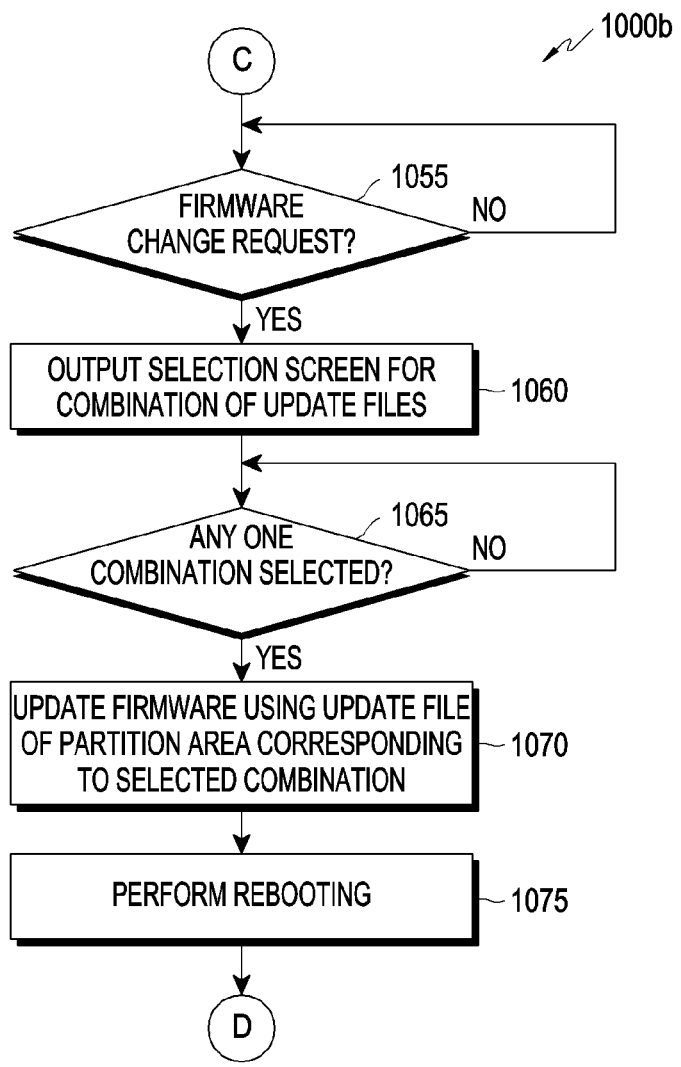
FIG. 10B is a flowchart of an operation continuing from the operation of FIG. 10A.

FIG. 10A is an operation flowchart 1000a for firmware update in an electronic device according to an embodiment, and FIG. 10B is an operation flowchart 1000b continuing from operations of FIG. 10A.

Referring to FIGS. 10A and 10B, an operation method may include operations 1005 through 1075. Steps/operations in the operation method may be performed by at least one of the electronic device (e.g., the electronic devices 101 and 401 of FIGS. 1 and 4) or at least one processor (e.g., the processors 120 and 420 of FIGS. 1 and 4) of the electronic device. In an embodiment, at least one of operations 1005 through 1075 may be omitted, an order of some of operations 1005 through 1075 may be changed, or other operations may be added.

In operation 1005, the electronic device 401 may identify whether firmware update starts. Upon start of the firmware update, the electronic device 401 may display a selection screen for a plurality of update files in operation 1010. The electronic device 401 may identify a combination of selected update files in response to user selection made through the selection screen, in operation 1015. In operation 1020, the electronic device 401 may generate at least one partition area corresponding to the number of combinations. For example, when user-desired items to be updated are three among ten updatable items, the electronic device 401 may generate partition areas corresponding to the number of combinations of the selected three items. Herein, a maximum of seven combinations may be possible given that one, two, or three are applied to each combination, and eight partition areas may be generated by adding one partition area, corresponding to seven combinations. In this case, the seven partition areas may be partition areas corresponding to respective combinations, and the other one area may be intended to download all the selected update files.

In operation 1025, the electronic device 401 may download the selected update files at a time in any one of the generated partition areas. In operation 1030, the electronic device 401 may store each firmware, updated based on the at least a part of the first firmware and the update files of the corresponding combination, in each partition area. For example, by copying the update files of the corresponding combination for the first firmware to each generated partition area, the updated firmware may be obtained.

Figure 11:
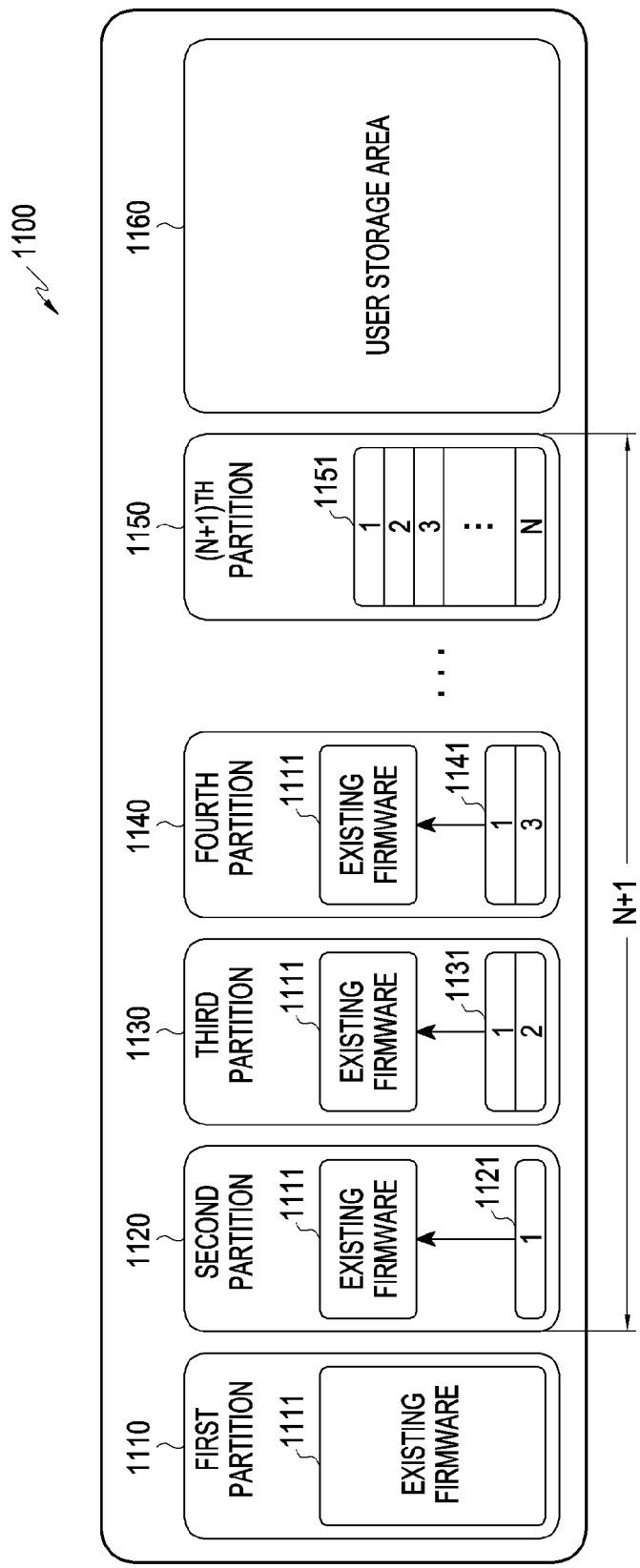
FIG. 11 illustrates a configuration of a plurality of partition areas according to various embodiments.

To be more specific, FIG. 11 will be referred to which is a view 1100 showing a configuration of a plurality of partition areas according to another embodiment.

As shown in FIG. 11, existing firmware 1111 is stored in a first partition 1110 and when the number of items to be updated by the user is N, i.e., N update files are selected, (N+1) partitions 1120, 1130, 1140, . . . , 1150 may be newly generated. To the generated partition areas 1120, 1130, 1140, . . . , 1150, update file combinations 1121, 1131, 1141, . . . , 1151 of a corresponding combination may be respectively copied. Herein, the (N+1)$^{th}$ partition area 1150 may be a partition area for storing N update files. For example, firmware update may be performed in the second partition area 1120 by applying a first combination 1121 to a part of the existing firmware 1111, firmware update may be performed in the third partition area 1130 by applying a second combination 1131 to a part of the existing firmware 1111, and firmware update may be performed in the fourth partition area 1140 by applying a third combination 1141 to a part of the existing firmware 1111. Thus, the updated firmware in each of the second partition area 1120 through the fourth partition area 1140 may be firmware of a different version or a different configuration. That is, when compared to the existing firmware, the updated firmware may be firmware in which updated items are different from those of the existing firmware.

In this case, the partition areas are generated in a storage area rather than a user storage area 1160, such that the partition area determined not to be used may be discarded and may be incorporated into the user storage area 1160.

As such, firmware update may be performed differently for each partition, and the electronic device 401 may perform rebooting after completion of update in operation 1040.

New firmware, generated by overwriting update files of a different combination for at least a part of the existing firmware to each partition area, may be stored. Thus, differently updated firmware may be stored in each partition area. In this case, the user has not yet finally determined firmware to be used, such that firmware update referring to data of any one partition area may be performed and completed through rebooting.

When the electronic device 401 obtains final determination regarding the updated firmware from the user in operation 1045, the electronic device 401 may set a partition area corresponding to the selected combination to a main partition area and delete the other partition areas than the main partition area in operation 1050. On the other hand, when the electronic device 401 does not obtain the determination to continuously use the updated firmware from the user in operation 1045, the electronic device 401 may go to operation 1055 of FIG. 10B to identify whether the firmware change request is obtained.

When obtaining the firmware change request in operation 1055, the electronic device 401 may display a selection screen for combinations of update files in operation 1060 and obtain selection of any one combination in operation 1065. When obtaining selection of any one combination, the electronic device 401 may select a partition area corresponding to the selected combination and perform firmware update by using data of the selected partition area, in operation 1070. Next, the electronic device 401 may perform rebooting in operation 1075 to proceed to operation 1005 of FIG. 10A. As such, when a partition area corresponding to each combination is allocated in advance, a time required for changing to a new combination of update files may be reduced.

Figure 12A:
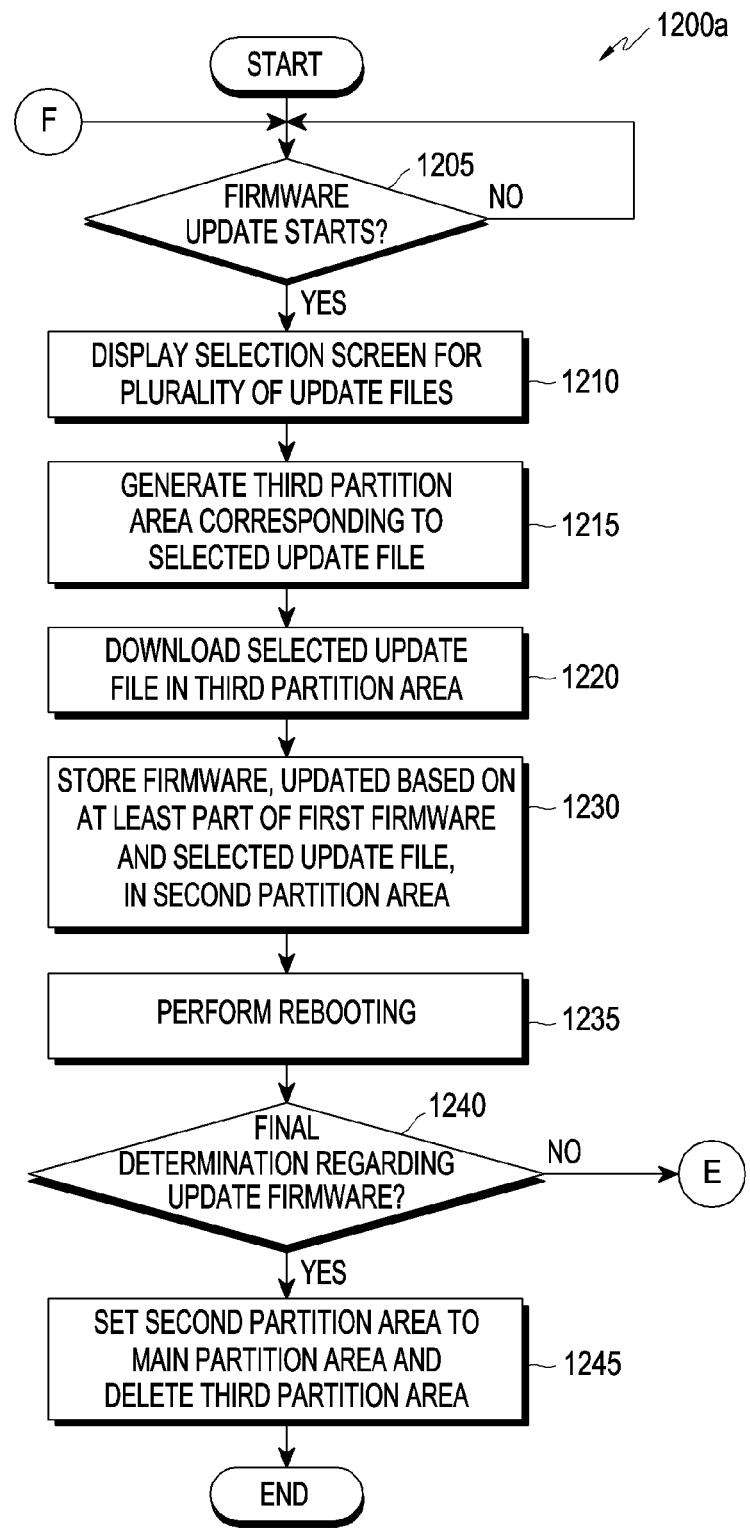
FIG. 12A is a flowchart of an operation of updating firmware in an electronic device, according to various embodiments.
Figure 12B:
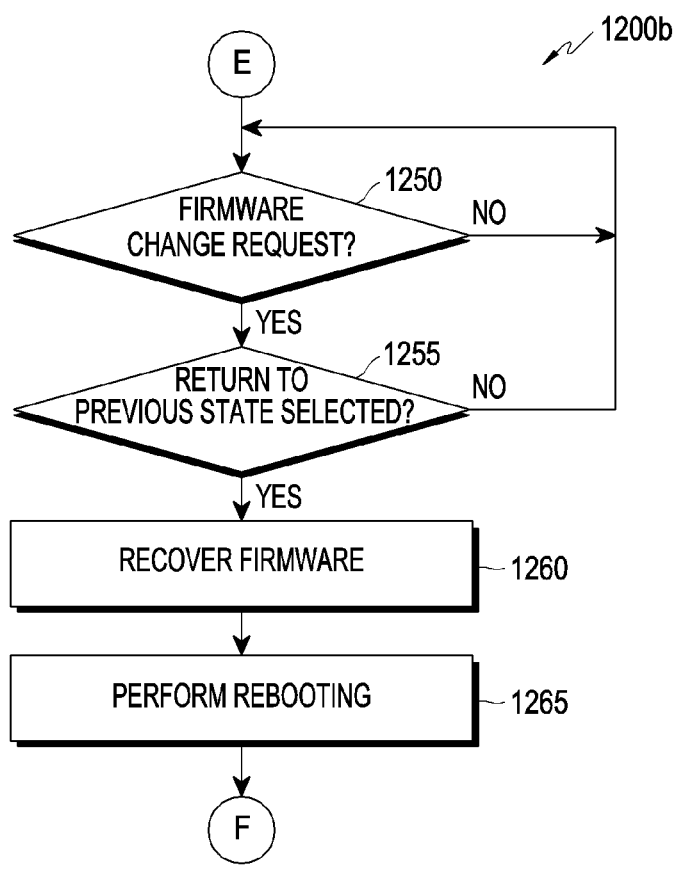
FIG. 12B is a flowchart of an operation continuing from the operation of FIG. 12A.

FIG. 12A is an operation flowchart 1200a for firmware update in an electronic device according to an embodiment, and FIG. 12B is an operation flowchart 1200b continuing from operations of FIG. 12A.

Referring to FIGS. 12A and 12B, an operation method may include operations 1205 through 1265. Steps/operations in the operation method may be performed by at least one of the electronic device (e.g., the electronic devices 101 and 401 of FIGS. 1 and 4) or at least one processor (e.g., the processors 120 and 420 of FIGS. 1 and 4) of the electronic device. In an embodiment, at least one of operations 1205 through 1265 may be omitted, an order of some of operations 1205 through 1 may be changed, or other operations may be added.

Referring to FIG. 12A, operations 1205 and 1210 may be the same as operations 1005 and 1010 of FIG. 10A and operations 910 and 920 of FIG. 9A, and thus will not be described in detail.

In operation 1215, the electronic device 401 may generate the third partition area corresponding to the selected update file in response to user selection while displaying an update guide screen including items for user selection with respect to the plurality of update files. For example, the electronic device 401 may designate the third partition area to download the selected update file.

The electronic device 401 may download the selected update files in the third partition area, in operation 1220.

The electronic device 401 may store the firmware, updated based on at least a part of the existing firmware, the first firmware, and the selected update file, in the second partition area in operation 1230, and perform rebooting in operation 1235.

Next, in operation 1240, the electronic device 401 may identify whether final determination regarding the updated firmware is obtained. When the electronic device 401 obtains final determination regarding the updated firmware, the electronic device 401 may set the second partition area to the main partition area and delete the third partition area to delete a downloaded update file because additional update is not required, in operation 1245.

On the other hand, when the electronic device 401 does not obtain final determination regarding the updated firmware, the electronic device 401 may go to operation 1250 of FIG. 12B to identify whether the firmware change request is obtained. When there is the firmware change request, the electronic device 401 may identify whether return to the previous state is selected, in operation 1255. When return to the previous state is selected, the electronic device 401 may perform firmware recovery to the existing firmware stored in the first partition area, i.e., the first firmware in operation 1260 and perform rebooting to drive the operating system based on the existing firmware in operation 1265. Herein, return to the previous state may be performed in response to user selection, but return to the previous state may be performed internally in the electronic device 401 according to occurrence of an event situation such as an error.

FIG. 13 is an exemplary diagram 1300 showing contents of an update file provided from a server, according to various embodiments, and FIG. 14 is an exemplary diagram 1400 showing a case in which an update file provided from a server is applied, according to various embodiments.

Referring to FIGS. 13 and 14, a schematic diagram of a data structure regarding update items available in the electronic device 401 is illustrated in FIG. 13 where an update file transmitted to the electronic device 401 through the server (e.g., the FOTA server 220) includes fix items. For example, an Android operator deals with security vulnerability details and function improvement that affect an Android device, and source code patches 1305 and 1310 for solving a problem in a security patch of the device in case of occurrence of the problem are shown. In FIG. 13, it is indicated that an update file made in the form of such a source code patch regards a 'libpac' library 1315.

Such an update file may be applied in place of the 'libpac' library file in the electronic device 401. For application of the update file, the electronic device 410 may enter a recovery mode and have mounted therein the currently used firmware and the update file, respectively, copy them to a new partition area, and perform rebooting, thereby completing application of the update file. Thus, as shown in FIG. 14, a 'libpac' library folder 1410 in the electronic device 401 may be updated with new contents.

As such, according to various embodiments, by using a delta file generated by extracting only a part corresponding to a difference between the new firmware and the existing firmware, the electronic device 401 may update the installed current-version firmware with new-version firmware including an update item desired by the user. Moreover, even when the electronic device 401 is driven with a new version of an operating system using updated firmware, the electronic device 401 may be recovered to the original state any time before final determination of the user or may be changed to firmware of another combination of update items, allowing stable firmware update.

An electronic device according to various embodiments may be one of various types of electronic devices, according to various embodiments of the present disclosure. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "$1^{st}$" and "$2^{nd}$," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the present disclosure, the module may be implemented in a form of an application-specific integrated circuit (ASIC).

Various embodiments of the present disclosure as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. When distributed online, at least part of the computer program product may be temporarily generated or at least temporarily stored in the machine-readable storage medium, such as memory of the manufacturer's server, a server of the application store, or a relay server.

According to various embodiments of the present disclosure, each component (e.g., a module or a program) of the above-described components may include a single entity or multiple entities. According to various embodiments of the present disclosure, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments of the present disclosure, operations performed by the module, the program, or another component may be carried out sequentially, in parallel, repeatedly, or heuristically, or one or more of the operations may be executed in a different order or omitted, or one or more other operations may be added.

According to various embodiments, in a storage medium having stored therein instructions, the instructions may be configured to, when executed by at least one processor, cause the at least one processor to perform at least one operation including outputting information about a plurality of update files for updating first firmware stored in a first partition area of a memory of the electronic device, and obtaining selection related to at least one first update file from among the plurality of update files and storing second firmware, obtained based on at least a part of the first firmware and the at least one first update file, in a second partition area of the memory, based on the selection.

The embodiments herein are provided merely for better understanding of the disclosure, and the disclosure should not be limited thereto or thereby. It should be appreciated by one of ordinary skill in the art that various changes in form or detail may be made to the embodiments without departing from the scope of the disclosure defined by the following claims.

The invention claimed is:

1. An electronic device comprising:
a display;
at least one processor; and
memory storing instructions configured to, when executed by the at least one processor, cause the electronic device to:
 display, on the display, information about a plurality of update files for updating first firmware stored in a first partition area of the memory;
 receive a selection for a first update file and a second update file from among the plurality of update files displayed on the display;
 in response to receiving the selection, identify combinations of the selected first update file and the selected second update file;
 generate second partition areas corresponding to a number of the combinations;
 generate second firmwares based on at least a part of the first firmware, the first update file and the second update file; and
 store each of the generated second firmwares in the second partition areas of the memory,
wherein the instructions are configured to cause the electronic device to drive an operating system with reference to at least a part of the second firmwares stored in the second partition areas, after rebooting according to a completion of an update of the first firmware.

2. The electronic device of claim 1, wherein the instructions are configured to cause the electronic device to:
download the plurality of update files in a third partition area of the memory.

3. The electronic device of claim 1, wherein the instructions are configured to cause the electronic device to:
obtain a selection related to at least one third update file from among the plurality of update files, in response to a change request for the second firmwares; and
replace the second firmwares with fourth firmware obtained based on a part of the first firmware and the at least one third update file.

4. The electronic device of claim 1, wherein the instructions are configured to cause the electronic device to drive an operating system with reference to the first firmware stored in the first partition area after rebooting, in response to a request for recovering the first firmware.

5. The electronic device of claim 1, wherein the information about the plurality of update files for updating the first firmware comprises at least one of operating system upgrade, an addition of a new feature, a bug fix, or a security fix item.

6. The electronic device of claim 1, wherein the instructions are configured to cause the electronic device to:
display the information about the plurality of update files for updating the first firmware on the display when receiving an update request from a server that provides the plurality of update files; and
download the first update file and the second update file among the plurality of update files, based on the selection.

7. A method for updating firmware in an electronic device, the method comprising:
displaying, on a display of the electronic device, information about a plurality of update files for updating a first firmware stored in a first partition area of a memory of the electronic device;
receiving a selection for a first update file and a second update file from among the plurality of update files displayed on the display;
in response to receiving the selection, identifying combinations of the selected first update file and the selected second update file;
generating second partition areas corresponding to a number of the combinations;
generating second firmwares based on at least a part of the first firmware, the first update file, and the second update file;
storing each of the generated second firmware in the second partition areas of the memory; and
driving an operating system with reference to at least a part of the second firmwares stored in the second partition areas, after rebooting according to completion of an update of the first firmware.

8. The method of claim 7, further comprising:
downloading the plurality of update files in a third partition area of the memory.

9. The method of claim 7, further comprising:
obtaining a selection related to at least one third update file from among the plurality of update files, in response to a change request for the second firmwares; and
replacing the second firmwares with fourth firmware obtained based on the at least a part of the first firmware and the at least one third update file.

10. The method of claim 7, wherein the information about the plurality of update files for updating the first firmware comprises at least one of operating system upgrade, an addition of a new feature, a bug fix, or a security fix item.

* * * * *